United States Patent Office 3,695,999
Patented Oct. 3, 1972

3,695,999
ISOLATION OF ENZYMES FROM AQUEOUS
MEDIA BY MEANS OF POLYANIONS
Peter Salvatore Forgione, 120 Little Hill Drive 06905, and Nelda Marjorie Smyth, 444 Bedford St. 06902, both of Stamford, Conn.
No Drawing. Filed July 22, 1970, Ser. No. 57,343
Int. Cl. C07g 7/02
U.S. Cl. 195—63                              5 Claims

ABSTRACT OF THE DISCLOSURE

Proteolytic enzymes, and particularly alkali stable proteases such as those produced by the fermentation of various microorganisms, are separated from the fermentation liquor by adding polyanions thereto. The polyanion forms with the enzyme a reversible ionic complex which precipitates upon acidification or upon the addition of a polycationic flocculating agent. For the most important uses, in soaps and detergents, it is unnecessary to separate the enzyme from the complex with the polymer.

BRIEF SUMMARY OF THE INVENTION

This invention relates to a method of recovering proteolytic enzymes from fermentation liquors. More particularly, the process involves adding a water soluble polyanion to the fermentation broth, then either adjusting the pH to from about 3.0 to about 4.0 or adding a water soluble polycationic flocculating agent, and recovering the so precipitated protease-polymer reversible ionic complex by any convenient means.

DETAILED DESCRIPTION OF THE INVENTION

Many microorganisms produce proteolytic enzymes as a by-product when propagated in fermentation media. Typical microorganisms which elaborate proteolytic enzymes are, for example, *Bacillus subtilis, Bacillus pumilis, Bacillus licheniformis, Pseudomonas aeruginosa, Proteus vulgaris, Aspergillus flavus, Aspergillus oryzae* and *Streptomyces griseus*. Studies on fermentation methods, media formulations, and conditions suitable for optimal production of proteolytic enzymes by such fermentations are well exemplified in the literature. See, for example, Maxwell, Australian Journal of Scientific Research, Series B, 5, 42 (1952). These enzymes, which are fairly high molecular weight proteins, for example from 25,000 to 30,000 molecular weight, attack proteins and hydrolyze them into smaller fractions or even into constituent amino acids. The enzymes are useful in the treating of hides prior to tanning, tenderizing meat, and other uses, such as cheese making, stabilizing of beer against turbidity, and the like. A very important recent use is the incorporation of the enzymes with detergent compositions, either synthetic or soaps. This has improved the cleaning efficiency of the detergents, particularly against such resistant soils as blood and other stains which contain proteins. For laundry use the proteases must be relatively stable in alkaline media so that they are not destroyed for sufficient time to allow the washing process to go to completion. For other uses where the medium is not strongly alkaline, alkali-sensitive proteolytic enzymes are, of course, also useful. Typical proteolytic enzymes are described in U.S. Pats. No. 2,927,060, and 2,936,265.

The problem of recovering the enzymes economically has been a serious one. In the two patents referred to above, tannic acid is employed, from which, if desired, the enzyme can be separated. Such a process, which isolates the enzyme or enzymes, is not excessively expensive where pure enzyme is used, as is needed, for example, in the use in foods, beverages, medical usage, such as the debridement of wound, burns and the like. However, when the enzymes are to be used in detergent compositions the factor of cost is a very serious matter, and there is therefore, a need for a cheap process of recovering proteolytic enzymes and particularly alkali-stable enzymes for detergent composition use.

The present invention deals with a process and in a more specific aspect also with a product. The process involves the precipitation of the proteolytic enzymes from their fermentation liquors by the addition of water soluble polyanions which are polymeric materials having pendant carboxylic acid groups. The water soluble polyanions operable in the novel process of the present invention may be represented by the following general formula:

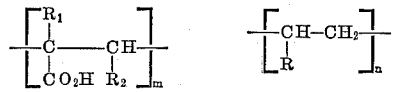

wherein $R_1$ is hydrogen or methyl, $R_2$ is hydrogen or carboxyl with the proviso that when $R_1$ is methyl then $R_2$ is hydrogen, R is phenyl, chloro, bromo, cyano, carboxamido, carboxy, lower alkoxy of 1–4 carbon atoms or lower alkanoyloxy of 2–4 carbon atoms, $m+n=10$ to 100,000 preferably 100 to 50,000, and the mole percent ratio of $m/n$ is from 1% to 100%, preferably from about 30% to 100%. Polyanions in accordance with the above general formula fall into two general classes. The first class consists of homopolymers of acrylic acid, methacrylic acid, and hydrolyzed maleic anhydride. The second class consists of copolymers of maleic anhydride, acrylic acid or methacrylic acid and polymerizable compounds containing a single $>C=CH_2$ group such as styrene, vinyl chloride, vinyl bromide, acrylonitrile, acrylamide, acrylic acid, vinyl ethers and vinyl esters; the maleic anhydride copolymers being hydrolyzed to achieve water solubility. Polyanions of this type together with their methods of preparation are disclosed in U.S. Pats. No. 2,047,398, 2,286,062, 2,490,489, 2,675,370, and 3,418,237; which are hereby incorporated by reference.

As starting material for the novel process of the present invention there is employed the fermentation liquor or broth which has been clarified by removing the mycleia and other insolubles by filtration. These fermentation broths generally have a pH value of from about 6 to about 8 and a proteolytic potency of about 100–200 Anson units per liter. In carrying out the novel process of the present invention, an aqueous solution of from about 0.03 gram to about 0.30 gram (preferably from about 0.05 gram to about 0.15 gram) per Anson unit of a polyanion is first added to the fermentation broth. For a broth assaying 100–200 Anson units per liter, the amount of polyanion added to form the complexes with the proteases would then be from about 3.0 grams to about 60.0 grams (preferably 5.0–30.3 grams) per liter of broth. In general, the amount of polyanion added should be somewhat in excess of the minimum required to form the complex with the protease. Excess polyanion will remain in solution upon filtration or centrifugation, and it is also possible, and in fact likely, that the complexes have varying relative amounts of protease and, of course, are quite likely to be mixtures of complexes. In general, the yield of the process can be determined by assay of the proteolytic activity of the dried complex. For this purpose the conventional units pused in the art, namely the Anson units, may be employed. This conventional method of assay for proteolytic activity depends on the ability of the sample to cause hydrolysis of casein under carefully controlled conditions. The extent of hydrolysis is usually measured spectrophotometrically after addition of trinitrobenzenesulfonic acid. An alternate analytical procedure that can be employed to assay the protease is to use ATEE (N-acetyl-L-tyrosine ethy lester) substrate using the standard pH start procedure.

As a practical matter, the aqueous solution of polyanion should contain from about 1.0% to about 20.0% by weight of the polyanion, preferably about 3–7% by weight. Following the addition of the aqueous polyanion solution to the fermentation broth, the pH is lowered to from about 3.0 to about 4.0. This pH adjustment may be accomplished with any dilute aqueous mineral acid solution such as dilute hydrochloric acid, dilute sulfuric acid, dilute phosphoric acid, and the like. The precipitated protease-polyanion complex is then removed by any convenient means such as filtration or centrifugation.

Alternatively, after formation of the protease-polyanion complex, an aqueous solution of a polycationic flocculating agent may be added to coagulate the complex in lieu of acidification to pH 3.0–4.0. If a flocculating agent is to be employed, the pH of the broth should first be adjusted to from about 4.5 to about 7.0 (preferably about 6.0) prior to the addition of the flocculating agent solution. Thus, in the case of a fermentation broth which is already on the acidic side (e.g. pH about 6.0), pH adjustment will not be necessary. This pH adjustment may also be accomplished with any dilute aqueous mineral acid solution. This flocculating agent solution should contain from about 0.1% to about 1.0% by weight of the flocculating agent, preferably about 0.5%. It has been determined that, for best results, from about one mg. to about ten mg. (preferably about five mg.) of flocculating agent per Anson unit of fermentation broth should be employed. The precipitated protease-polyanion-polycation complex is then removed by any convenient means such as filtration or centrifugation. Either process may be carried out at temperatures of from about 2° C. to about 40° C., preferably 15°–30° C.

Thus, when acidification is employed, a protease-polyanion complex is obtained having from about 30 mg. to about 300 mg. (preferably 50–150 mg.) of polyanion per Anson unit of proteolytic activity. However, when a flocculating agent is employed, a protease-polyanion-polycation complex is obtained having from about 30 mg. to about 310 mg. (preferably 50–160 mg.) of polyanion and polycation polymer mixture per Anson unit of proteolytic activity and the ratio of polyanion to polycation in the polymer is from about 10:1 to about 70:1. In general, the protease-polymer products thus obtained by the novel processes of the present invention usually have a proteolytic activity of about 2–7 Anson units per gram, typically about 4–5 Anson units per gram.

Any type of polycationic water soluble flocculating agent is suitable for use in the novel process of the present invention. For example, quaternary ammonium salt type polycations such as those disclosed in U.S. Pat. No. 3,288,770 are particularly useful. Equally good results may be obtained with quaternary phosphonium salt type polycations such as those set forth in U.S. Pat. No. 3,168,502 and with poly[(methylimino)-(2-hydroxytrimethylene)]hydrochloride resins such as those set forth in U.S. Pat. No. 3,493,502. Also of value as flocculating agents are the polyacrylamide type copolymers disclosed in U.S. Pats. Nos. 3,418,237 and 3,171,805 and related polycationics described therein and the polyvinylimidazol- ones as described in U.S. Pat. No. 3,288,707; all of the above cited patents being hereby incorporated by reference.

Very effective recovery of a considerable portion of the protease, for example 50% to 90%, is obtained; and in the case of the alkali-stable proteases to be used in detergent compositions, the complex of the polymer and the protease can be used without separation of the constituents, which is an important economic advantage. Therefore, in one of the aspects of the present invention the complexes of the alkali-stable proteases and polymers are includede as new products.

The products of the proteases and the polyanions have been referred to as reversible protease-polyanion ionic complexes. Their exact chemical nature has not been determined, but covalent bonding is not involved and the product is not a physical mixture. These complexes are ionic compounds or mixtures of ionic compounds derived from the interaction of a protease and a charged polymer such as a polyanion, either with or without a polycation. These compounds are not necessarily combined in any limiting stoichiometry and may be either water soluble or may precipitate from solution. The chemical bonds are reversible because the preferred products of the alkali-stable proteases and polyanions (with or without polycations) are useful in detergent compositions without further treatment, whereas the complexes with tannic acid are less effective. While it is not intended to limit the present invention to theories of chemical constitution and the like, it seems probable that the proteolytic enzyme complexes with polyanions or with polyanions-polycations of the present invention are sufficiently reversible so that under conditions of use in detergent compositions the proteolytic entzyme is set free. It is known that the enzymen operates with full efficiency in attacking protein material, and it seems probable that the enzyme is set free from the polymeric complex as the product is soluble under the alkaline laundering conditions. The probability that the chemical bonds are quite loose is further enhanced by the fact that as far as known, the tannic acid complexes are not practically useful in detergents and evidently do not set free the proteases in sufficient amount.

The process aspect of the present invention is useful in the precipitation of any protease regardless of whether it is alkali-stable or not and regardless of whether it is to be subjected to further treatments such as to separate or further purify the enzyme. In the more specific aspects of the present invention, and particularly the product aspect, the complexes with the alkali-stable proteases are covered and because of the commercial advantages obtainable may be considered as the preferred modification of the present invention. The remainder of the specification will describe such preferred process and compositions, but in the broader aspects the invention is not limited thereto and includes the precipitation of other enzymes. Among these are lipases, amylases, invertase, glucose oxidase, pectic enzymes, glucose isomerase, and the like, as well as proteases, whether alkali-stable or alkali-sensitive.

In referring to the alkali-stable proteases, it should be understood that this does not mean that the protease is completely unaffected by alkali in any concentration and at any temperature. However, the preferred products of the present invention under ordinary laundering conditions of pH of 9 to 10 and 50° C. have a half life of from 25 to 30 minutes, which is quite long enough to exert their effect on protein soil. Therefore, when alkali-stable proteases are referred to in the specification it should be understood that they are stable within these reasonable limits and does not mean that they cannot be attacked at any temperature under strong alkaline conditions.

When the polymeric complexes of the present invention are carefully dried under temperature conditions which do not degrade the protease, they are usually white or gray powders or solids and in the dry form are extremely stable, keeping without significant loss of activity for a year or more. This long shelf life is, of course, an important practical advantage.

The alkali-stable proteases, which form the preferred complexes of the present invention, have not had their exact chemical constitution determined. It seems that there is a definite difference in the nature of the amino acids forming them. They are either free from or have few or no amino acids with sulfhydryl or disulfide groups, such as may be present where the amino acids cystine or systeine are present in significant amounts. The proteases also do not depend for their stability on the presence of any metal ions, which is a further practical advantage.

In the product aspect of the present invention, which includes detergent products with the polymer-alkali stable protease complexes, the proportion of the complex to the detergent is not in any way critical. It is normally fairly small and for a protease-complex product having an activity of 4–5 Anson units per gram will range practically from 0.01% to 0.05% (preferably from 0.075% to 0.20%) of the detergent composition. The low percentage needed because of the high activity of the complexes of the present invention is a further practical advantage as it reduces the cost of enzyme fortified detergent compositions.

All of the products of the specific examples which will be described below are effective in a standard wash test. A standard test cloth stained with blood, milk and ink (EMPA–116) is washed with a 0.15% aqueous solution of the particular enzyme complex-detergent composition at 120° F. for 10 minutes at 100 cycles/min. The cloth is then rinsed at 100° F. for 5 minutes, ironed dry and conditioned to room temperature. Stain values are then read, as is customary in the art, with a Hunter D–25 color difference meter. Values are compared with the same wash with the same detergent composition but without any complex of polyanion and alkali-stable protease. In general the wash test is used with detergent compositions which have from 3.75 Anson units to 7.5 Anson units per kg.

Products from any of the following isolation procedures may be obtained as white, friable solids as (1) slurrying the wet solids, which have been initially separated by gravitational settling or centrifugation, in polar, water miscible non-solvents such as acetone or isopropyl alcohol followed by filtration, rinsing and air drying; or by (2) reslurrying the centrifuged or settled solids in water at a pH slightly below 7.0 and freeze-drying or spray drying.

DESCRIPTION OF THE PREFERRED EMBODIMENTS

Example 1

A fermentation medium of the following composition was inoculated with a strain of *Bacillus subtilis* and aerobically fermented at 37° C. for 36 hours.

| | |
|---|---|
| Starch _____gm./l__ | 80 |
| Soy flour _____gm./l__ | 30 |
| $CaCl_2 \cdot 2H_2O$ _____gm./l__ | 0.4 |
| $MgCl_2 \cdot 6H_2O$ _____gm./l__ | 0.2 |
| Casein _____gm./l__ | 6 |
| $K_2HPO_4$ _____gm./l__ | 3 |
| Polyalkylene glycol (defoaming agent) ___percent__ | 0.1 |
| Water—q.s. to volume. | |

The mash was then cooled and filtered after the addition of a filter aid and a flocculating agent. The strain is one which is known to produce alkali-stable proteases.

Example 2

A fermentation medium of the following composition was inoculated with a strain of *Conidiobolus brefeldianus* and aerobically fermented at 5 p.s.i.g. back pressure at 27° C. Additional glucose was added as needed.

| | |
|---|---|
| Calcium carbonate _____gm./l__ | 50 |
| Glucose _____gm./l__ | 70 |
| Sperm oil _____v./v__ | 1 |

The mash was filtered after 180 hours of fermentation. The strain is one which is known to produce alkali-stable proteases.

Example 3

Into two parts of a *B. subtilis* fermentation broth (150 Anson units/l.) was stirred one part of a 1% aqueous solution of Cypres® 48 solids. Cypres® 48 is a 20% aqueous solution of a high molecular weight hydrolyzed 1:1 copolymer of styrene and maleic anhydride. The pH of the resulting mixture was adjusted to 6.0–6.2 with 1.0 N hydrochloric acid. Then, 0.3 part of a 1% aqueous solution of Cat-Floc® solids was added with rapid stirring. Cat-Floc® is a 15% aqueous solution of a cationic polymer of dimethyl diallyl ammonium halide (U.S. Pat. 33,288,770). When the Cat-Floc® addition was completed, stirring speed was reduced so that the system was only gently agitated and stirring was continued for 2 to 3 minutes. As much as the supernatant as possible was then syphoned off using a screen to hold back the precipitate. To the wet precipitate was added sufficient acetone to give an acetone:water ratio of at least 1.5:1. The precipitate was slurried in the acetone with rapid stirring for above five minutes. The precipitate was allowed to settle a few minutes before filtering onto No. 1 filter paper. The filter cake was given a final rinse with fresh acetone. The air-dried product was white, fine and powdery and contained 95–99% of the activity of the fermentation broth.

Example 4

In a similar fashion, a *B. subtilis* fermentation broth of 150 Anson units/liter was treated essentially as in Example 3 above, but with slight modifications (see Table I below).

TABLE I.—ISOLATION OF PROTEASE

| Parts of— | | | |
|---|---|---|---|
| Fermentation broth | Polystyrene-maleic acid (5%) | Cat-Floc® (1%) | Percent enzyme isolated |
| 8 | 1.0 | 0.20 | 76.5 |
| 8 | 1.1 | 0.20 | 82.2 |
| 8 | 1.2 | 0.25 | 82.0 |

Example 5

In a fashion similar to Example 3, 0.2 part of a 1% aqueous solution of polyvinylimidazolone (U.S. Pat. 3,288,707) was used to flocculate the Cypres® 48 enzyme adduct at a pH of 4.5 from a *B. subtilis* fermentation broth having 135 Anson units/liter. The product was isolated by centrifugation and contained 74% of the fermentation broth activity.

Example 6

Into two parts of a *B. subtilis* fermentation broth (80 Anson units/l.) was stirred one part of a 1% aqueous solution of polymethacrylic acid (mol. wt.>10,000). The pH of the resulting mixture was adjusted slowly with stirring to pH 3.3 with 0.1 N sulfuric acid. Stirring was continued for 2 more minutes and then the precipitated solids were removed by centrifugation. The moist polymer-enzyme complex was then dried to a fine powdery product containing 95–99% of the activity of the fermentation broth.

Example 7

The protease enzyme was isolated from a *B. subtilis* fermentation broth having 74 Anson units/liter in a fashion similar to that in Example 6, except that a 1% aqueous solution of polymethacrylic acid (mol. wt. about 100,000) was used at varied levels (see Table II below).

TABLE II.—ISOLATION OF PROTEASE

| Parts of— | | |
|---|---|---|
| Fermentation broth | Polymethacrylic acid (1%) | Percent enzyme isolated |
| 8 | 5 | 36 |
| 6 | 5 | 73 |
| 6 | 6 | 75 |
| 4 | 8 | 87 |

Example 8

Into 2.2 parts of a *B. subtilis* fermentation broth (35 Anson units/l.) was stirred 1 part of a 1% aqueous solution of polyacrylic acid (mol. wt. >25,000). The pH of the resulting mixture was adjusted slowly with stirring to pH 3.2 with dilute 0.1 N hydrochloric acid and stirring was continued for 2 more minutes at room temperature. The precipitated solids were separated by centrifugation and dried by freeze drying. The tan powdery product contained 85% of the activity of the fermentation broth using one of the standard analytical procedures (ATEE, N-acetyl-L-tyrosine ethyl ester substrate).

Example 9

Into one part of a *B. subtilis* fermentation broth (35 Anson units/l.) was stirred 1 part of poly(acrylic acid-acrylamide) (60.40 mole ratio; mol. wt. about 1,000,000) as a 1% aqueous solution. The pH of the resulting mixture was slowly adjusted to pH 3.2 with 0.1 N hydrochloric acid at room temperature and stirring was continued for 2 additional minutes. The insoluble protease polymer complex was isolated by centrifugation and dried. Assay of the product (ATEE method) indicated 68% recovery of enzyme.

Example 10

Into one part of *B. subtilis* fermentation broth (40 Anson units/l.) was stirred 2 parts of a 0.5% aqueous solution of poly(acrylic acid-maleic acid) (80:20 mole percent respectively; mol. wt. about 500,000). The pH of the resulting mixture was slowly adjusted with stirring to pH 3.3 with 0.1 N sulfusic acid. The insoluble psoduct was isolated by centrifugation and freeze dried. Assay of product indicated 61% recovery of protease.

Example 11

The procedure of Example 3 was repeated except that no flocculating agent was osed and the pH of the broth was adjusted to 3.4. The air-dried product thus obtained was white, fine and powdery and contained 95-99% of the activity of the fermentation broth.

Example 12

To 26 parts of a *B. subtilis* fermentation broth (135 Anson units/l.) was added one part of a 20% aqueous solution of a medium molecular weight copolymer of styrene-maleic acid (1:1 ratio, molecular weight about 100,000). While stirring the pH was adjusted to 4.5 with 10% sulfuric acid and then 3 parts of a 1% aqueous solution of polyvinylimidazolone was added. The solids were removed by centrifugation and contained 94% of the fermentation broth activity.

Example 13

Eight parts of a *B. subtilis* fermentation broth (145 Anson units/l.) was pretreated at pH 8.5 with one part of a 1% aqueous solution of polyacrolein solubilized by treatment with sodium bisulfite. The precipitate which formed was removed by centrifugation. The pH of the supernatant was lowered to 4.5 and then 7 parts of a 1% aqueous solution of a 1:1 styrene-maleic acid copolymer (mol. wt. about 30,000) was added. After adjusting the pH back to 4.5 there was added two parts of a 1% aqueous solution of polyvinylimidazolone. The precipitated solids were removed by centrifugation and were found to contain 73% of the fermentation borth activity.

Example 14

To one part of a *B. subtilis* fermentation broth (60 Anson units/l.) there was added one part of a 1% aqueous solution of a 1:1 copolymer of vinyl methyl ether-maleic acid (mol. wt. about 1,000,000). While stirring, the pH was lowered to 3.2 with 0.1 N hydrochloric acid. The precipitated solids were removed by centrifugation and were found to contain 48% of the fermentation broth activity.

We claim:

1. A process of recovering a protease from an aqueous medium containing said protease which comprises the steps of:

(a) adding to the aqueous medium an aqueous solution of from about 0.03 gram to about 0.30 gram of a polyanionic polymeric material having the formula

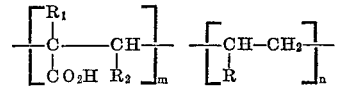

wherein $R_1$ is hydrogen or methyl, $R_2$ is hydrogen or carboxyl with the proviso that when $R_1$ is methyl then $R_2$ is hydrogen, R is phenyl, chloro, bromo, cyano, carboxamido, carboxy, lower alkoxy of 1–4 carbon atoms or lower alkanoyloxy of 2–4 carbon atoms, $m+n$ equals 10 to 100,000 and the mole percent ratio of $m/n$ is from 1% to 100%, per Anson unit of proteolytic activity of the aqueous medium whereupon a reversible ionic protease-polyanion complex forms, (b) acidifying the aqueous medium to a pH of from about 4.5 to about 7.0, (c) adding to the aqueous medium an aqueous solution of from about one mg. to about ten mg. of a polycationic polymeric flocculating agent per Anson unit of proteolytic activity of the aqueous medium whereupon a reversible ionic protease-polyanion-polycation complex precipitates, (d) removing said protease-polyanion-polycation complex from the aqueous medium, and (e) drying said protease-polyanion-polycation complex.

2. A process according to claim 1 wherein the polyanion is a hydrolyzed copolymer of maleic anhydride and styrene and the polycationic flocculating agent is a polyquaternary ammonium salt.

3. A process according to claim 1 wherein the aqueous medium is a fermentation broth derived from a fermentation under submerged aerobic conditions in an aqueous nutrient medium containing assimilable sources of carbon, nitrogen and inorganic salts with a strain of a protease-producing species of a genus selected from the group consisting of Bacillus, Aspergillus and Streptomyces.

4. A dry reversible ionic complex of an alkali stable protease, a polyanionic polymeric material having the formula

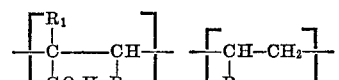

wherein $R_1$ is hydrogen or methyl, $R_2$ is hydrogen or carboxyl with the proviso that when $R_1$ is methyl then $R_2$ is hydrogen, R is phenyl, chloro, bromo, cyano, carboxamido, carboxy, lower alkoxy of 1-4 carbon atoms, or lower alkanoyloxy of 2-4 carbon atoms, $m+n$ equals 10 to 100,000 and the mole percent ratio of $m/n$ is from 1% to 100% and a polycationic polymeric material, the total combined amount of said polyanionic and polycationic materials being from about 30 mg. to about 310 mg. of polymeric material per Anson unit of proteolytic activity of the complex and the ratio of polyanion to polycation in said total amount of polymeric material being from about 10:1 to about 70:1.

5. A detergent composition containing from about 0.01% to about 0.5% of a product of claim 4.

References Cited
UNITED STATES PATENTS

| | | |
|---|---|---|
| 3,502,545 | 3/1970 | Westman et al. _____ 195—66 R |
| 3,483,090 | 12/1969 | Barton _____ 195—66 R |
| 3,558,498 | 1/1971 | Eymery et al. _____ 195—63 X |
| 3,498,913 | 3/1970 | Sellet _____ 210—54 |

LIONEL M. SHAPIRO, Primary Examiner

D. M. NAFF, Assistant Examiner

U.S. Cl. X.R.

195—66 R, 68, DIG 11; 252—89, 132, DIG 12

UNITED STATES PATENT OFFICE
CERTIFICATE OF CORRECTION

Patent No. 3,695,999          Dated October 3, 1972

Inventor(s) Peter Salvatore Forgione and Nelda Marjorie Smyth

It is certified that error appears in the above-identified patent and that said Letters Patent are hereby corrected as shown below:

Column 1, line 7, insert the words "assignors to American Cyanamid Company, Stamford, Conn." after the word Conn.

Signed and sealed this 3rd day of April 1973.

(SEAL)
Attest:

EDWARD M. FLETCHER, JR.
Attesting Officer

ROBERT GOTTSCHALK
Commissioner of Patents